United States Patent
Bell, Jr.

[11] 3,746,826
[45] July 17, 1973

[54] SHORT CIRCUIT PROTECTION SYSTEM FOR ELECTRICAL DISCHARGE MACHINING POWER SUPPLY APPARATUS

[75] Inventor: Oliver A. Bell, Jr., Mooresville, N.C.

[73] Assignee: Colt Industries Operating Corp., Davidson, N.C.

[22] Filed: Jan. 19, 1972

[21] Appl. No.: 219,022

[52] U.S. Cl............................. 219/69 S, 219/69 C
[51] Int. Cl.............................................. B23p 1/08
[58] Field of Search................ 219/69 C, 69 G, 69 S

[56] References Cited
UNITED STATES PATENTS
3,548,142 12/1970 Sennowitz.......................... 219/69 C Primary Examiner—R. F. Staubly
Attorney—Robert C. Hauke et al.

[57] ABSTRACT

A protection circuit which responds to gap short circuit condition to provide appropriate interruption of machining power pulses to the gap. Responsive to gap voltage drop below a predetermined level an electronic switch is used to shunt current from a drive transistor which provides an output from the pulse generator to interrupt the drive signal output during the continuation of the gap short circuit condition. The circuit includes a field effect transistor and a controlled fast charging network for a capacitor controlling triggering of the transistor.

11 Claims, 2 Drawing Figures

SHORT CIRCUIT PROTECTION SYSTEM FOR ELECTRICAL DISCHARGE MACHINING POWER SUPPLY APPARATUS

REFERENCE TO RELATED APPLICATIONS

This application is related to my U. S. application Ser. No. 218,271, filed on Jan. 17, 1972, for "Protection Circuit for Electrical Discharge Machining Power Supply Apparatus."

BACKGROUND OF THE INVENTION

Gap short circuit power interruption systems are known to the prior art in which any of a number of electrical parameters representing such condition are used as a signal to initiate either the interruption of the main electrical discharge machining power supply or, alternately, the interruption of the pulse generator which furnishes the triggering pulses to the electronic output switches which are used in the EDM power supply.

The present invention is particularly related to those embodiments of electrical discharge machining power supplies in which the output switches are transistors and in which there is included a pulse generator of the independent operating type, such as a multivibrator, an oscillator, or the like. While transistors are employed as the electronic switching means, the present invention is not limited to use in conjunction with such devices. By "electronic switch," I mean any electronic control device having a plurality of electrodes comprising at least two principal or power conducting electrodes acting to control current flow in the power circuit, the conductivity of the power circuit being controlled by a control electrode within the switch, whereby the conductivity of the power circuit is regulated statically or electrically without the movement of any mechanical elements within the switch. Included within this definition by way of illustration, but not limitation, are vacuum tubes, transistors, semiconductor controlled rectifiers and the like.

Various prior art gap short circuit control systems have been developed to provide for interruption of machining current responsive to that gap condition. One example of such a short circuit protection system is disclosed and claimed in Robert S. Webb U. S. Pat. No. 3,018,411 issued on Jan. 23, 1962 for "Per Pulse Cut-Off Circuit," which patent is of common ownership with the present application. The system that is described in that patent is one in which responsive to gap short circuit current, there is provided an instantaneous per pulse cut-off operation. The method and apparatus of that patent differ from the present invention with respect to the mode of operation which is of the per pulse type and not of the averaging type used in the instant invention.

An additional example of a gap short circuit protection system is shown and described in Kurt Sennowitz, U. S. Pat. No. 3,548,142 issued on Dec. 15, 1970 for "Gap Short Circuit Control System for Electrical Discharge Machining Apparatus," which patent is also of common ownership with the present application. The system disclosed in that patent relates to one in which the drive stage output is actually grounded direct to the gap for the duration of the gap short circuit condition.

BRIEF SUMMARY OF THE INVENTION

The present invention incorporates a protection circuit which responds to an averaging signal taken from the machining gap and then controls the actuation of a field effect transistor, which in turn operates a cut-off switch to shunt the multivibrator output signal for the continuing duration of the gap short circuit condition. A capacitor and a fast charging network are included in the control circuit for the field effect transistor.

BRIEF DESCRIPTION OF THE DRAWINGS

The present invention, its operation, features and advantages and the advancements which it afford will be understood from the following specification, together with the drawings in which like numerals are used to refer to identical parts where they occur, and wherein.

DETAILED DESCRIPTION OF THE PREFERRED EMBODIMENT

Figure 1:
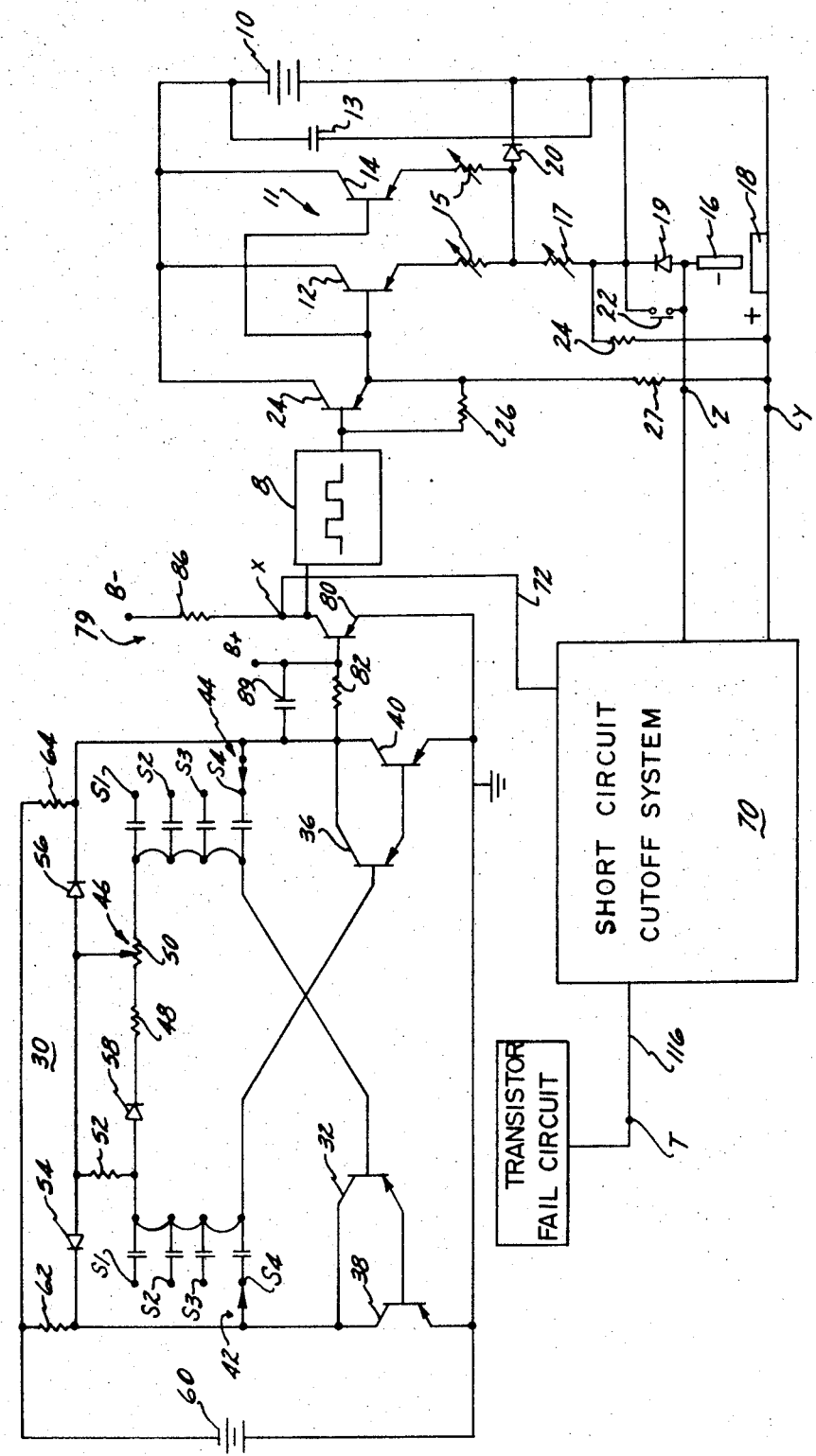
FIG. 1 is a schematic showing of a power supply circuit for electrical discharge machining partially diagrammatic in form and showing in block diagram form the portion of the circuit relating to the present invention.

FIG. 1 shows the basic parts of an electrical discharge machining power supply apparatus which includes a multivibrator 30 and its drive stage 8, a main machining power source 10 and a bank 11 of electronic output switches, including a pair of transistors 12 and 14, both of which have their principal electrodes connected between the machining power source 10 and the machining gap. The machining gap includes a negative polarity tool electrode 16 and a positive polarity workpiece 18. A filter capacitor 13 is connected across the power source 10, which source is normally derived from an AC input through a full wave rectifier stage. Series resistors 15 are connected between the respective emitters of the transistors 12 and 14 and the negative gap tool electrode 16, while an additional adjustable resistor 17 is connected in series with a diode 19 and the machining gap. A separate diode 20 is connected between the lower terminal of the right hand resistor 15 and the positive terminal of the power source 10 in blocking polarity. Also included in the gap circuit are a switch 22 and a shunt resistor 24. The switch 22 is employed to reverse the gap polarity when this condition is required because of the particular combination of workpiece and electrode material being used for machining.

The present invention is described with relationship to an electrical discharge machining apparatus in which there is included a single machining gap, but it is equally applicable to an apparatus set-up in which more than one workpiece is being cut at the same time or, alternately, a segmented electrode with portions insulated one from the other is being used to cut several separate cavities in a single workpiece at the same time in a manner well known to the art.

With respect to FIG. 1, it will further be seen that each output stage has before it a final drive stage incorporating a transistor 24 which is used to provide a triggering signal to the control electrode of both the output transistors 12 and 14 to control their switching. A protective resistor 26 is shown connected across the base and emitter of the drive transistor 24, while a second resistor 27 is connected in series with its emitter. It will be understood that in most cases more than one amplification and pulse shaping stage are required between the pulse generator output and the final output transistor bank 11.

The pulse generator used to provide for the triggering pulses for a first drive stage 79, for the drive stage transistor 24, and for the output transistors 12 and 14 is a free running multivibrator 30, which is shown at the upper left hand side of the drawing. Included in the multivibrator 30 as its major components are a pair of alternately operable transistors 32 and 36 which have coupled to them Darlington connected transistors 38 and 40, respectively. This connection is employed to increase the magnitude of the power output taken from the multivibrator 30. In accordance with normal astable multivibrator design, the frequency of operation is controlled by the relative magnitude of the several possible resistor-capacitor network combinations. In the return networks, as indicated in the FIG. 1 drawing, there are several frequency settings as are indicated by the letters S1 – S4. The frequency of operation of the multivibrator 30 is accordingly selected by the manual operation of the ganged switches 42 and 44. The current magnitude for the machining power pulses is controlled by the setting of the potentiometer 46, which controls the relative on-off times of the multivibrator 30. Also included in the multivibrator circuit is a fixed resistor 48 and connected in series with the variable resistor 50 of the potentiometer 46, and diodes 54, 56 and 58 poled in the manner shown. The operating voltage for the multivibrator 30 is provided by a separate DC voltage source 60 which has in series with it a pair of equal value current limiting transistors 62 and 64. A separate short circuit cut-off system 70 is shown in block form, together with the several leads which provide that system with the necessary inputs for its operation. It will further be seen that the control output from the short circuit cut-off system 70 is provided through a lead 72 in a manner and for a purpose which will be explained more completely hereinafter.

Also shown in FIG. 1 is the first drive stage 79 associated with the multivibrator 30, which stage is interrupted responsive to gap short circuit condition. The drive stage 79 includes a transistor 80 which receives a signal output from the emitter of the multivibrator transistor 36. The input network to the drive stage 79 includes a parallel resistor 82 and capacitor 89 network. A suitable positive bias B+ is connected to the base of the transistor 80, while a load resistor 86 is connected in series between the collector of the transistor 80 and a minus voltage source. The lead 72 is shown with its connection at point X to provide for the shunting of current from the transistor 80 during the gap short circuit condition so as to interrupt the operation of the output transistors 12 and 14, thereby to stop pulses to the gap for the duration of the gap short circuit condition. The two inputs to the short circuit protection system 70 are derived from point X which constitutes the negative gap terminal at the tool electrode 16, and from point Y which represents the zero reference level of the positive gap terminal at the workpiece 18.

Figure 2:
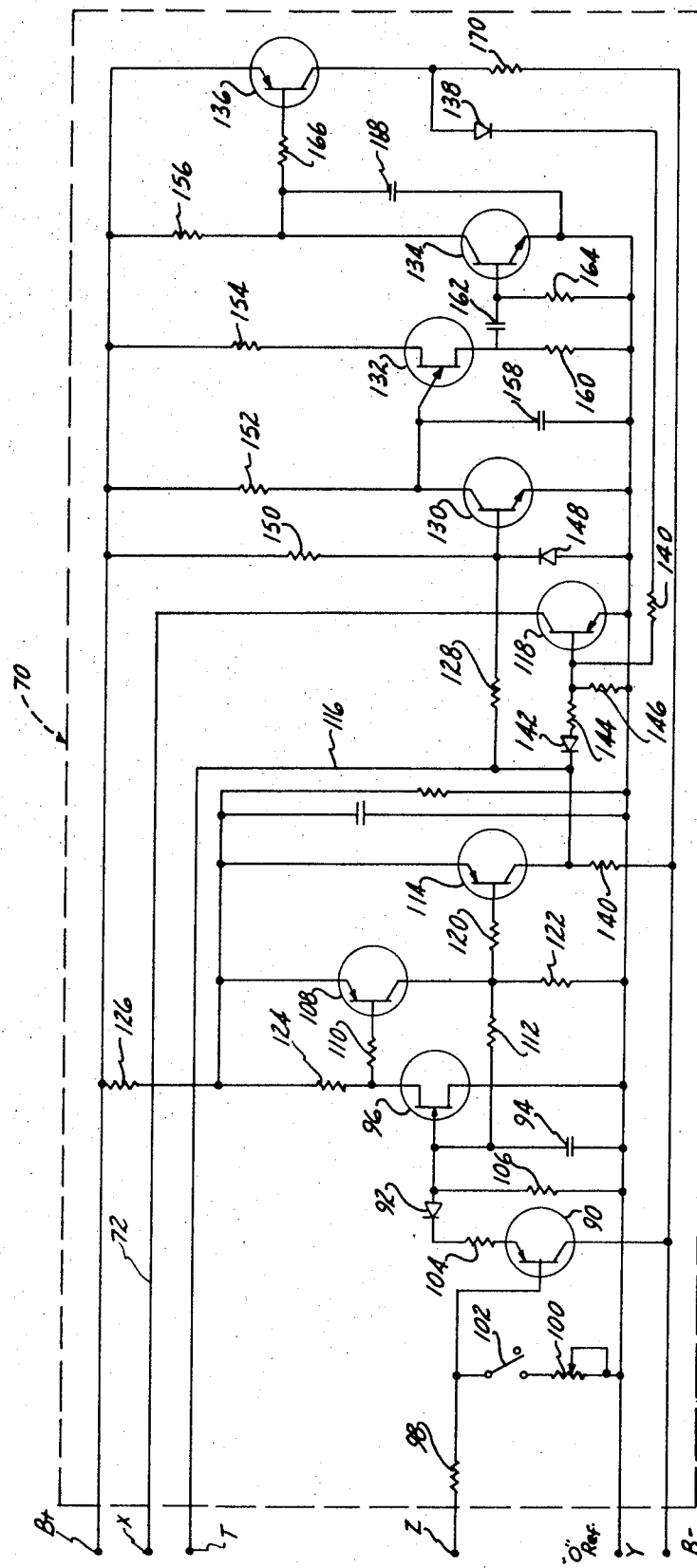
FIG. 2 is a detail schematic of the gap short circuit cut-off system provided by the present invention.

FIG. 2 is a detail schematic showing the manner in which the drive switch 80 is controlled to interrupt the machining power pulses during gap short circuit. Included in the circuit is the input network which includes a transistor 90 and a diode 92 which control the fast charging of a capacitor 94, which in turn controls the conduction of a field effect transistor 96. Connected in series with the base of the transistor 90 is a signal resistor 98. A variable potentiometer 100 is connected in series with an enabling switch 202. The resistor 98 and potentiometer 100 form a voltage divider for the gap voltage signal received. In addition, a load resistor 104 is connected in series between the cathode of the diode 92 and the emitter of the transistor 90. A resistor 106 is connected across the capacitor 94 to provide a capacitor discharge path.

It will be seen that a relatively large magnitude negative voltage signal is provided from the machining gap to the base of the transistor 90 during normal cutting voltage swing across the gap. The negative voltage charge stored on the capacitor 94 provides a hold-off bias to the gate of the FET transistor 96. When the gap voltage and accordingly the voltage stored on the capacitor 94 drop to a predetermined level, the signal provided to the base of the transistor 96 will turn it on as the capacitor 94 is discharged through the resistor 106. This results in a turn-on of the next stage transistor 108.

After the transistor 108 has been turned on by the signal through resistor 110, a positive bias is fed through a resistor 112 back to the base of the FET transistor 96 to hold it on. At this point, the next following transistor 114 is turned off as its collector goes negative. An output signal is then provided from the collector of the transistor 114 and passes through a lead 116 to provide an inhibit signal to the transistor fail circuit shown in diagrammatic form in FIG. 1 and indicated with an input terminal T.

Reference is made to my aforementioned patent application Ser. No. 218,271 which relates to a transistor fail cut-off circuit for a full explanation of the circuit and of the manner in which the inhibit signal is provided to interrupt the transistor fail cut-off circuit for the duration of any gap short circuit condition. At the same time the inhibit signal is passed through the lead 116 to the transistor fail circuit, the transistor 118 is forwardly biased thus turning it on.

Also connected in circuit with the base of the transistor 114 is a series resistor 120. A load resistor 122 is further connected in series with the collector of the transistor 108. Hold-off bias to the base of the transistor 108 is provided through a resistor 124 and a resistor 126, which are serially connected to the terminal of a B+ voltage source. The collector of the transistor 118, as has already been indicated, is coupled to a terminal X in such manner that when the transistor 118 is turned on it will provide a shunting of current from the drive transistor 80 of the drive stage 79 so as to interrupt its output and thus interrupt those machining power pulses being passed to the gap.

It should be noted that the circuit shown in FIG. 1 is adapted to drive one or more output stages 11 to provide machining power pulses over single or multiple machining gaps according to the machining operation being carried out. At the same time the cut-off transistor 118 is rendered conductive, a signal is passed through resistor 128 to the base of a transistor 130 which turns it on, rendering a unijunction transistor 132 conductive at the same time. When the transistor 132 is turned on, it provides a triggering pulse to a next transistor 134 turning it on. The conduction of the transistor 134 provides a turn-on signal to the base of the next following transistor 136 also rendering it conductive. Responsive to the turn-on of the transistor 136, a reverse bias is provided from its collector through a diode 138 and a signal resistor 140, which then turns off the cut-off transistor 118 to interrupt the cut-off signal being furnished through terminal X to the drive stage 79. At this point, the cut-off circuit 70 has been returned to a ready condition for response to the next occurring gap short circuit condition.

The several switching transistors of the protection circuit 70 include for transistor 114 a collector load resistor 140. Connected in series with the base of the transistor 118 are a signal diode 142 and a series resistor 144. A resistor 146 is used to provide a bias between the base-emitter junction of the transistor 118. A protective diode 148 is connected across the base-emitter junction of the transistor 130. A bias is provided from the B+ source through a resistor 150 connected in series with the base of the transistor 130. Load resistors 152, 154 and 156 are connected in series with the associated power conducting electrodes of the transistors 130, 132 and 134, respectively. The firing of the unijunction transistor 132 depends upon the control voltage charge on the capacitor 158. The lower base of the unijunction transistor 132 is suitably biased by a resistor 160. The triggering network for the transistor 134 includes a series capacitor 162, while the base-emitter junction of the transistor 134 is biased through a resistor 164. The triggering input network for the final stage transistor 136 includes a series current limiting resistor 166, while a capacitor 168 is connected across the emitter-collector of the transistor 134. The output provided during the conductive condition of the transistor 136 is provided through the diode 138. A load resistor 170 is connected in series with the transistor collector 136 and a negative voltage source.

It will thus be seen that the present invention provides a gap cut-off circuit responsive to gap short circuit condition which provides a cut-off operation with respect to an intermediate drive stage following the pulse generator-multivibrator 30. At the same time the output from the multivibrator is interrupted, there is provided a cut-off signal to an associated output transistor fail circuit which otherwise might be operated unintentionally during the gap short circuit mode of operation. The gap short circuit protection system thus provided is one which operates reliably over an interval of several pulses responsive to an averaged input from the gap and which then efficiently interrupts the machining until the gap short circuit condition is removed.

What is claimed is:

1. In an electrical discharge machining apparatus including a pulse generator, a drive stage connected to the output of said pulse generator and an electronic output switch operable by said drive stage and having its principal electrodes connected in series with a power supply across a dielectric coolant filled gap for providing machining power pulses thereacross, a short circuit protection system including a means for sensing gap short circuit condition and providing a signal output representative thereof, a cut-off switch having its output operably connected to said drive stage to interrupt its operation responsive to said signal, and a circuit connected between said sensing means and said cut-off switch for triggering it into operation, said circuit including a capacitor and a fast charging network for said capacitor, said network including an electronic switch having its control electrode connected to the gap for sensing gap voltage and a diode connected in the charge path of said capacitor, said diode further coupled in series between one of the principal electrodes of said last electronic switch and said capacitor.

2. The combination as set forth in claim 1 wherein a turn-off network is operably connected to said cut-off switch for returning it to a normally non-conductive condition in readiness for the next occurrence of gap short circuit condition.

3. The combination as set forth in claim 1 wherein a voltage limiting divider network is connected between said sensing means and said last mentioned electronic switch.

4. In an electrical discharge machining apparatus having a pulse generator and at least one electronic output switch operably connected to the triggering output of said pulse generator and coupled between a power supply and a gap for providing machining power pulses thereto, a gap short circuit cut-off system for interrupting pulses to said output switch comprising an electronic cut-off switch having its output connected to the pulse generator output for shunting it responsive to said condition, a sensing means operably connected between said gap and the control electrode of said cut-off switch, a resistor connected in series with said sensing means, an input electronic switch having its control electrode connected to said series resistor and its output connected to said cut-off switch for operating it, a storage capacitor operably connected to the control electrode of said input electronic switch and a diode connected in series with said capacitor for providing fast charge of said capacitor.

5. The combination as set forth in claim 4 wherein a separate drive stage switch is connected intermediate said pulse generator and the control electrode of said output switch, and wherein the output of said cut-off switch is connected to one of the principal electrodes of said drive stage switch for shunting current therefrom and interrupting drive signal to said output switch responsive to said condition.

6. The combination as set forth in claim 4 wherein said capacitor is connected across the base and one principal electrode of said input electronic switch, said switch comprising a field effect type transistor.

7. In an electrical discharge machining apparatus including a pulse generator, a drive stage connected to the output of said pulse generator and an electronic output switch operable by said drive stage and having its principal electrodes connected between a power supply and a dielectric coolant filled gap for providing machining power pulses thereacross, a short circuit protection system including a means for sensing gap short circuit condition coupled to the gap, an electronic cut-off switch operably connected to said sensing means and having its output connected to said drive stage for shunting the drive signal during such condition, wherein the improvement comprises an input network for controlling the actuation of said cut-off switch, said network having a voltage divider and an input electronic switch, said voltage divider connected between said sensing means and the control electrode of said input electronic switch, said input switch comprising a field effect transistor including a capacitor connected across its gate and one of its power conducting electrodes for controlling its operation responsive to voltage charge maintained on said capacitor representative of gap voltage level.

8. The combination as set forth in claim 7 wherein a fast charging network for said capacitor is connected intermediate said divider and the control electrode of said field effect transistor, such charging network including a transistor and a diode, said transistor having its control electrode coupled to said voltage divider, said transistor further having said diode connected in series with one plate of said capacitor and a corresponding one of its principal electrodes.

9. The combination as set forth in claim 7 wherein a circuit is operatively connected to said capacitor for recharging it subsequent to removal of said short circuit condition.

10. The combination as set forth in claim 9 wherein said last mentioned circuit includes a unijunction transistor operatively connected to the gate of said field effect transistor and to said capacitor for returning it to its normally non-conducting condition subsequent to removal of said short circuit condition.

11. In an electrical discharge machining apparatus having a pulse generator and at least one electronic output switch operably connected to the triggering output of said pulse generator and coupled between a power supply and a gap for providing machining power pulses thereto, a gap short circuit cut-off system for interrupting pulses to said output switch comprising an electronic cut-off switch having its output connected to the pulse generator output for shunting it responsive to said condition, a sensing means operably connected between said gap and the control electrode of said cut-off switch, a resistor connected in series with said sensing means, an input electronic switch having its control electrode connected to said series resistor and its output connected to said cut-off switch for operating it, a storage capacitor operably connected to the control electrode of said input electronic switch and a diode connected in series with said capacitor for providing fast charge of said capacitor, and a separate drive stage switch which is connected intermediate said pulse generator and the control electrode of said output switch, said cut-off switch having its output connected to one of the principal electrodes of said drive stage switch for shunting current therefrom and interrupting drive signal to said output switch responsive to said condition, said cut-off switch further operable to provide a second output signal responsive to its operation, said apparatus having a transistor fail circuit responsive to drop in drive voltage level, said second output signal operable to inhibit said transistor fail circuit responsive to operation of said gap short circuit cut-off system.

* * * * *